United States Patent [19]
Hagerty

[11] Patent Number: 6,056,006
[45] Date of Patent: May 2, 2000

[54] PISTON PRESSURE REGULATOR

[75] Inventor: Phillip J. Hagerty, Marshall, Mich.

[73] Assignee: Marshall Excelsior Company, Marshall, Mich.

[21] Appl. No.: 09/223,099

[22] Filed: Dec. 30, 1998

[51] Int. Cl.⁷ .................................................. G05D 16/02
[52] U.S. Cl. ..................................... 137/269; 137/505.25
[58] Field of Search ............................ 137/269, 505.25, 137/505.28

[56] References Cited

U.S. PATENT DOCUMENTS

| | | | |
|---|---|---|---|
| 614,441 | 11/1898 | Burnett | 137/505.25 |
| 1,900,514 | 3/1933 | McLean. | |
| 2,917,073 | 12/1959 | Dintelkamp | 137/505.25 |
| 3,995,656 | 12/1976 | Mills, Jr. | 137/505.25 |
| 4,194,522 | 3/1980 | Lucas et al. | 137/505.25 |
| 4,257,449 | 3/1981 | Takagi | 137/505.25 |
| 4,373,550 | 2/1983 | Yelich | 137/516.29 |
| 4,924,904 | 5/1990 | Carter | 137/505.25 |
| 5,103,859 | 4/1992 | Martin et al. | 137/448 |
| 5,135,023 | 8/1992 | Ross | 137/505.25 |
| 5,188,150 | 2/1993 | Esplin | 137/630.14 |
| 5,411,053 | 5/1995 | Markham et al. | 137/505.28 |
| 5,522,421 | 6/1996 | Holt et al. | 137/505.25 |
| 5,890,508 | 4/1999 | Powell | 137/269 |

FOREIGN PATENT DOCUMENTS 1966571  8/1969  Germany ........................... 137/505.25

Primary Examiner—Stephen M. Hepperle
Attorney, Agent, or Firm—Waters and Morse, P.C.

[57] ABSTRACT

A piston pressure regulator has a body, a corresponding piston, and a floating seal. The body includes an interior piston cavity, a low pressure port connected with the piston cavity, and a high pressure port connected with the piston cavity. Further, the piston cavity has a length. The corresponding piston is located in the piston cavity and cooperates with the piston cavity to define low pressure and high pressure portions of the piston cavity and low pressure and high pressure sides of the piston. The piston also slides along the piston cavity length, between the low and high pressure ports. The seal is a wafer member that is interposed between the piston and the high pressure port. The seal is separate from each of the piston and the high pressure port to "float" between the piston and the high pressure port. Seals of different thicknesses may be substituted to adjust the operating pressure.

2 Claims, 1 Drawing Sheet

PISTON PRESSURE REGULATOR

CROSS-REFERENCES TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

The invention relates to fluid flow piston pressure regulators. More particularly, the invention relates to the regulation of an operating pressure of a flow of fluid from a source of fluid that is supplied at a pressure that is higher than a desired operating pressure, and in which a biased piston is used to open and close a high pressure supply port.

The broad concept of piston pressure regulators is well known and such regulators are widely used in a variety of applications. As such, various configurations of piston pressure regulators are known, include axial- and cross-flow regulators, for example. One of several common features of piston pressure regulators is that they use a biased piston to open and close a high pressure supply port according to the pressure of the operating or service fluid that is being regulated for use. Typically, a seal is set into a terminal end of a piston stem, so the seal will abut and close the high pressure supply port. Alternatively, the seal may be inset into a peripheral area of the high pressure supply port itself. Either way, fabricating a seat for the seal requires a production step that imposes a production cost. Further, assembly of the seal by seating the seal into the seat adds further to the production process and costs.

BRIEF SUMMARY OF THE INVENTION

Accordingly, a piston pressure regulator of the invention eliminates the prior need for a seal seat and so also eliminates the associated production costs. A piston pressure regulator of the invention has a body, a corresponding piston, and a floating seal. The body includes an interior piston cavity, a low pressure port connected with the piston cavity, and a high pressure port connected with the piston cavity. Further, the piston cavity has a length. The corresponding piston is located in the piston cavity and cooperates with the piston cavity to define low pressure and high pressure portions of the piston cavity and low pressure and high pressure sides of the piston. The piston also slides along the piston cavity length, between the low and high pressure ports. The seal is a wafer member that is interposed between the piston and the high pressure port. The seal is separate from each of the piston and the high pressure port.

These and other features, objects, and benefits of the invention will be recognized by one having ordinary skill in the art and by those who practice the invention, from the specification, the claims, and the drawing figures.

DETAILED DESCRIPTION OF THE INVENTION

Figure 2:
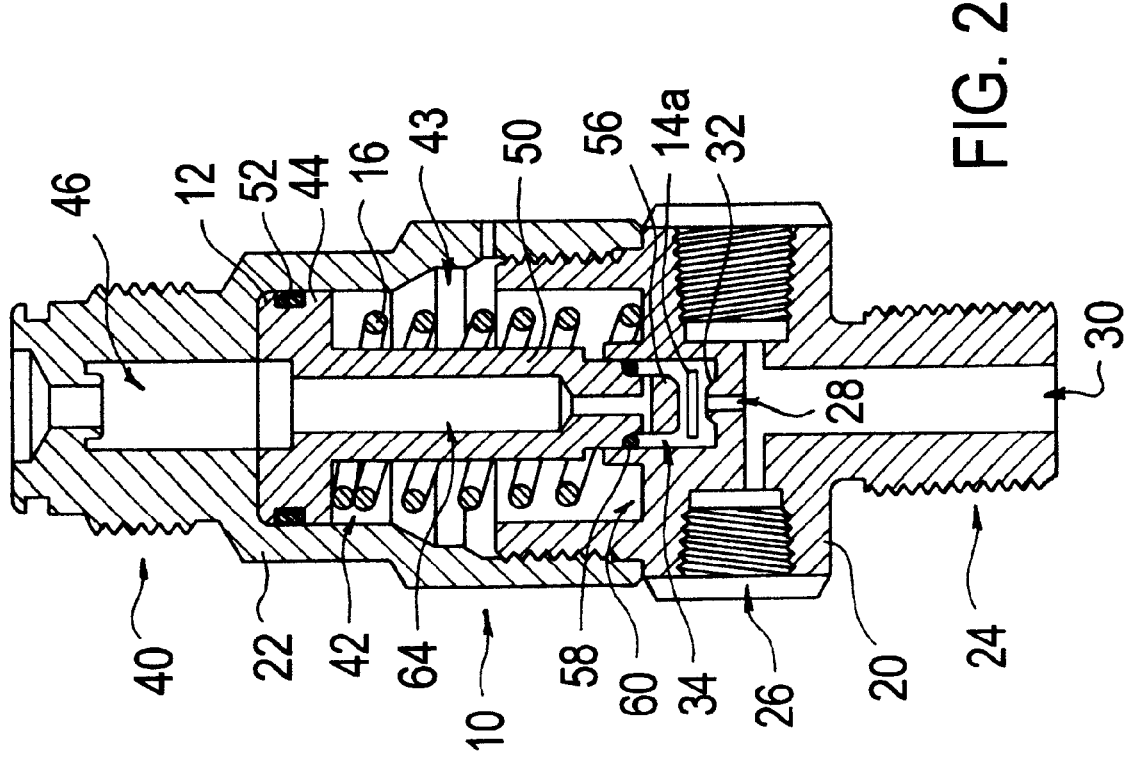
FIG. 2 shows the device of FIG. 1 with a valve seal of different thickness.
Figure 1:
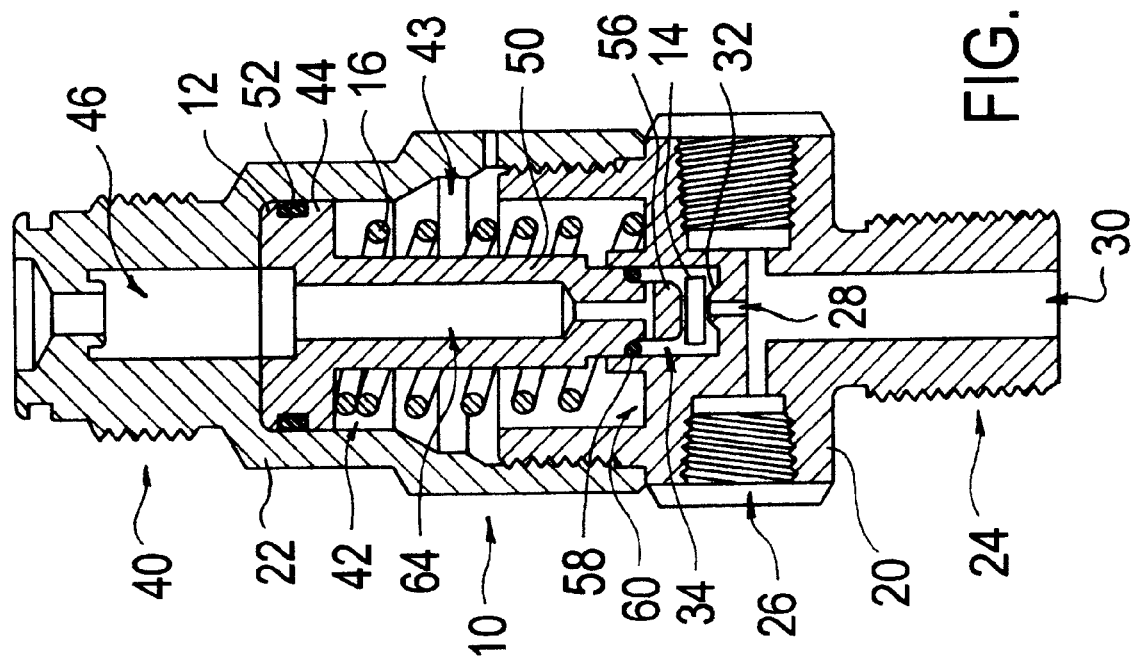
FIG. 1 is a longitudinal cross-sectional view of a piston pressure regulator according to the invention.

A piston pressure regulator according to the invention is shown in longitudinal cross-sectional view in the drawing figures and has a body 10, a piston 12, a valve seal 14, 14a, and a bias member 16. One having ordinary skill in the art will know that fluid flow piston pressure regulators are generally well known in various configurations, including cross flow and axial flow regulators, for example. While an axial flow regulator is specifically shown in the drawing figure, the invention will also apply to other regulator configurations. One having ordinary skill in the art will also understand that the various components of the regulator can be successfully constructed from various materials, and by various methods. Some of the materials used may include metals and plastics, for example.

As is shown, the body 10 may be constructed in two parts, including a high pressure portion 20 and a low pressure portion 22. The high pressure portion 20 is shown to have a high pressure coupling 24 and a pair of high pressure taps 26, which may be plugged or used for a pressure gauge or the like, as is commonly known in the art. A high pressure port 28 is also provided in the high pressure body portion 20. A high pressure fluid passage 30 interconnects the high pressure coupler 24 with the high pressure taps 26, and with the high pressure port 28. The high pressure port 28 has a seal surface 32 and opens into a generally cylindrical portion of a piston chamber 34.

The low pressure portion 22 of the body 10 is provided with a low pressure coupling 40 as is commonly known in the art, and another generally cylindrical portion 42 of a piston chamber 43 that is adapted to receive a piston head 44 of the piston 12. A low pressure fluid passage 46 interconnects the low pressure coupling 40 and the piston chamber 42. The high pressure 20 and low pressure 22 body portions may be screw thread connected to define the interior piston chamber or cavity 43. The piston 12 is positioned in the piston cavity 43 in sliding engagement.

The piston 12 includes the piston head 44 and a stem 50 that extends away from the piston head. The piston head 44 is positioned in the cylindrical portion 42 and an O-ring seal 52 or the like may be provided between the piston head and the body 22 as is generally understood by one having ordinary skill in the art. A terminal end 56 of the stem 50 is located in the other cylindrical portion 34 and may also be provided with an O-ring seal 58 or the like, again as is generally understood by one having ordinary skill in the art.

A spring seat 60 is defined in the high pressure portion 20 of the body and a bias member 16 in the form of a helical coil spring may be provided over the piston stem 50 to bear against the spring seat 60 and the piston head 44. The bias member or spring 16 biases the piston away from the high pressure port 28 and controls a predetermined low pressure operating or supply pressure for the piston pressure regulator. One having ordinary skill in the art will understand that variation in the characteristics of the bias member or spring 16 will result in a relatively stiffer or softer bias of the piston 12 away from the high pressure port 28, and will result in a relatively higher or lower, low pressure operating or supply pressure.

Fluid flow through the regulator is provided by the fluid passage 30 at the high pressure coupler 24, the high pressure port 28, the fluid passage 46 at the low pressure coupler 40, and a fluid passage 64 through the piston 12 from the high pressure port to the low pressure coupling. The piston passage 64 is shown to extend between openings at the stem terminal end 56 and at the piston head 44.

The seal 14 is preferably provided by a polygonal wafer or circular disk member that is positioned in the cylindrical portion 34, at the high pressure port 28. The seal 14 is constructed of any suitable seal material, including Teflon (PTFE) or high density polyethylene (HDPE), for example. The seal member 14 is sized or dimensioned to allow passage of fluid around perimeter edges of the seal, between the seal and the body 20, while maintaining a sufficient portion of the seal in alignment with the high pressure port 28 for sealing clamping of the seal between the high pressure port and the piston 12. Thus, the seal "floats" between the piston stem 50 and the high pressure port 28 when the piston stem is separated from the high pressure port.

More particularly, the seal 14 has generally planar opposing surfaces, The high pressure port 28 has a cooperating sealing surface that faces the seal 14 and the piston 12. And, the piston stem terminal end 56 has a cooperating sealing surface that faces the seal 14 and the high pressure port 28. Thus, the sealing surface of the stem terminal end 56 can abut one seal planar surface and the sealing surface of the high pressure port 28 can abut the opposing seal planar surface to clamp the seal between the piston 12 and the high pressure port. The seal 14 is clamped between the piston 12 and the high pressure port 28 when the predetermined operating low pressure is obtained at the low pressure coupling, whereby the spring bias 16 is overcome and the piston 12 moves toward the high pressure port 28 to close and seal the high pressure port, as is understood by one having ordinary skill in the art.

Variation of the thickness of the seal chip 14, 14a will affect the effective distance between the high pressure port 28 and the piston head 44, which in turn affects the resulting operating pressure. For example, with a desired operating pressure of about 850psi (pounds per square inch), the inventor has found that increasing and decreasing the seal chip thickness about fifty percent (±50%) may vary the operating pressure from about 870 psi to about 820 psi, respectively. One having ordinary skill in the art will understand that while bias springs may be acceptably consistent within a give production lot or batch, they may vary from batch to batch. Thus, the thickness of the seal chip may be adjusted to compensate for the variation between batches of bias springs. Further, one will understand that the concept of adjusting or controlling the operating pressure with variation of the seal chip thickness may be extended to constructing a piston pressure regulator to provide a range of operating pressures, with a preset operating pressure being selected according to a preselected seal chip that has a predetermined thickness. The concept may also be extended to using temperature or moisture sensitive seal materials, for example, so the seal chip may fine tune the operating low pressure according to fluctuating fluid characteristics.

It will be understood by one having ordinary skill in the art and by those who practice the invention, that various modifications and improvements may be made without departing from the spirit of the disclosed concept. Various relational terms, including left, right, front, back, top, and bottom, for example, are used in the detailed description of the invention and in the claims only to convey relative positioning of various elements of the claimed invention. The scope of protection afforded is to be determined by the claims and by the breadth of interpretation allowed by law.

I claim:

1. A piston pressure regulator comprising:

a body that has an interior piston cavity, a low pressure port connected with the piston cavity, and a high pressure port connected with the piston cavity, the piston cavity having a length;

a corresponding piston in the piston cavity, the piston cooperating with the piston cavity to define low pressure and high pressure portions of the piston cavity and low pressure and high pressure sides of the piston, the piston being slidable along the piston cavity length and being located between the low and high pressure ports;

a seal interposed between the piston and the high pressure port, the seal being a wafer member that is separate from each of the piston and the high pressure port, the seal being one of a number of seals, wherein each seal has a seal length, has a seal width, and has a seal thickness, and wherein each seal has a different thickness, whereby an operating pressure is predetermined by the thickness of the seal.

2. A piston pressure regulator comprising:

a body that has an interior piston cavity, a low pressure port connected with the piston cavity, and a high pressure port connected with the piston cavity, the piston cavity having a length;

a corresponding piston in the piston cavity, the piston cooperating with the piston cavity to define low pressure and high pressure portions of the piston cavity and low pressure and high pressure sides of the piston, the piston being slidable along the piston cavity length and being located between the low and high pressure ports;

a seal interposed between the piston and the high pressure port, the seal being separate from each of the piston and the high pressure port, the seal being adapted to float between and be clamped between the piston and the high pressure port during operation of the piston pressure regulator, the seal having generally planar, first and second opposing surfaces that abut the piston and the high pressure port when the seal is clamped between the piston and the high pressure port, the seal being one of a number of seals, wherein each seal has a seal length, has a seal width, and has a seal thickness, and wherein each seal has a different thickness, whereby an operating pressure is predetermined by the thickness of the seal.

* * * * *